Feb. 1, 1944.                J. J. CHYLE                2,340,796
                              ARC WELDING
                         Filed Oct. 5, 1942
FIG. 1.                FIG. 2.              FIG. 3.
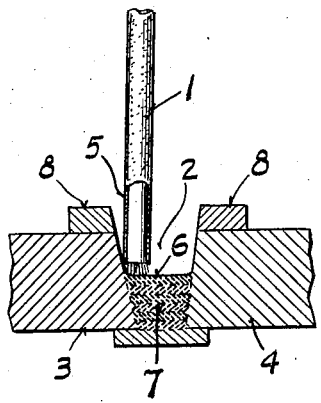
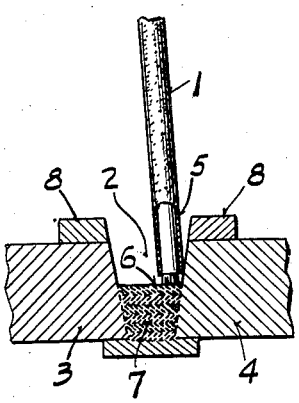
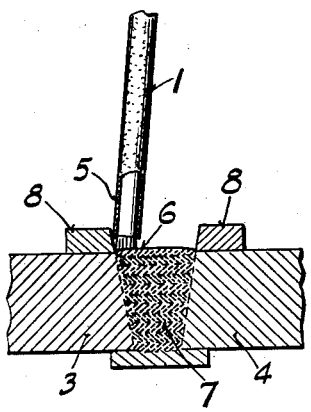
FIG. 4.
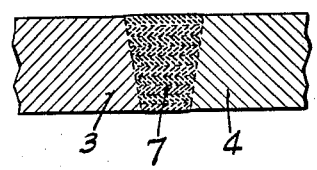
FIG. 5.
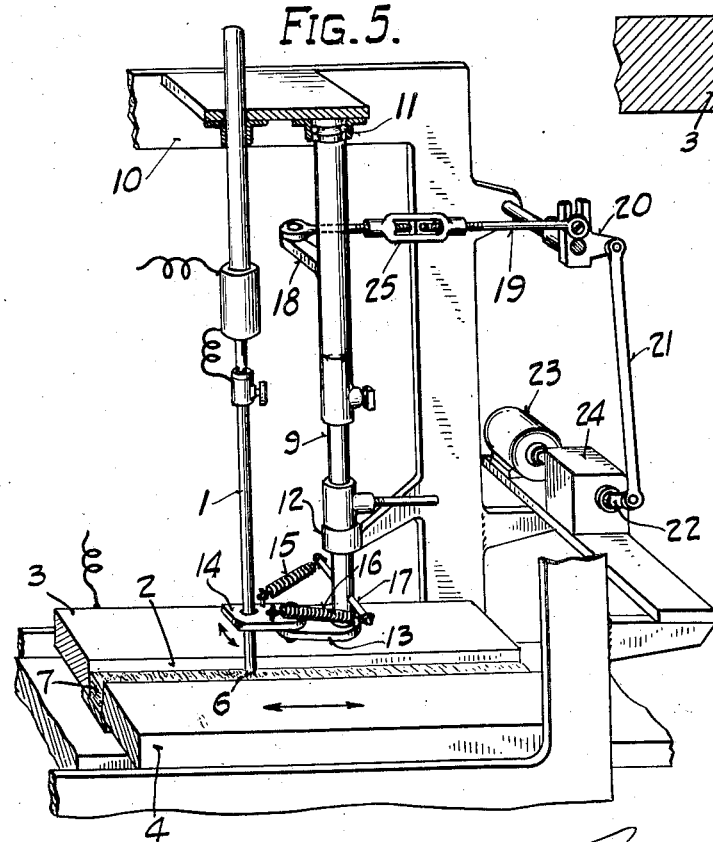
John J. Chyle
INVENTOR.
BY *[signature]*
ATTORNEY.

Patented Feb. 1, 1944

2,340,796

UNITED STATES PATENT OFFICE 2,340,796

ARC WELDING

John J. Chyle, Wauwatosa, Wis., assignor to A. O. Smith Corporation, Milwaukee, Wis., a corporation of New York Application October 5, 1942, Serial No. 460,777

4 Claims. (Cl. 219—10)

This invention relates to arc welding in which a covered metallic electrode is employed and is fused by the heat of the arc and progressively deposited at the joint to butt weld thick members together.

In such welding operations of thick plates and the like, it has been the practice to employ a welding groove between the opposed edges of the plates with the side walls of the groove slanting outwardly at a slight angle. It has also been the practice to deposit the weld metal in separate passes in which each layer of the deposit is fused with the layer beneath and with the side walls of the groove. This practice of depositing the weld metal in layers includes the manipulation of the welding electrode in a weaving action from side to side of the longitudinal center of the welding groove as the electrode progresses along the groove. This is so for both manual and automatic welding processes.

Heretofore, in carrying out these practices difficulty was encountered in attempting to obtain a uniformity of fusion between the layers and the side walls of the groove. With some electrodes undercutting of the side walls of the groove was so pronounced that uniformity of fusion could not be obtained. With other electrodes producing a desirable meniscus, the lack of side wall penetration often resulted in a non-uniformity of fusion and a possible defective weld.

No guide was provided for the manual operator to determine the fusion obtained, and in the case of automatic welding the tolerances and variations in the width of the groove made any setting of the machine as to weaving of the electrode too fixed relative to the conditions to be met.

The object of the present invention is to obtain more uniform conditions of fusion between the deposited metal and the side walls of the groove throughout the welding operations.

The accompanying drawing illustrates the practice of the invention and the views of the drawing are as follows:

Figure 1 is a transverse section across a seam partially welded and illustrating the electrode in one position of oscillation;

Fig. 2 is a similar section across a seam illustrating the electrode in an opposite position of oscillation;

Fig. 3 is a similar transverse section showing the final welding operation;

Fig. 4 is a similar section of a completed welded joint; and

Fig. 5 is a schematic showing of an automatic apparatus for carrying out the invention.

In carrying out the invention, the covered electrode 1 is oscillated transversely of the groove 2 between the parts 3 and 4 in a manner causing the covering 5 of the electrode to engage the side wall of the groove at each side in the respective transverse extremes of movement of the electrode so that the width of oscillation is dependent upon the actual position of the side walls instead of being fixed with respect to the center line of the groove. Tolerances and variations in the width of the groove are eliminated as factors in determining the approach of the arc toward the respective side walls.

The number of oscillations of the electrode in a given time should be sufficient, having regard for the rate of forward movement of the electrode, to maintain a single pool 6 of molten weld metal in the wake of the arc having its central heat line substantially coinciding with the longitudinal center line of the groove, as distinguished from a pool that weaves from side to side as in old practice. The invention has been practiced with considerable success when oscillating the electrode 1 from side to side in the groove 2 at a rate of about one hundred oscillations per minute.

The invention can be practiced either manually or with automatic welding machines. Generally the number of oscillations per minute will be lower in manual welding than in automatic welding.

When a welding groove is nearly filled with layers of weld metal 7, the upper one or two passes are deposited without the electrode engaging the edges of the parts. Usually, with deep grooves, the upper layers are quite insignificant to the total thickness of the joint and side-wall difficulties are relatively unimportant at the top. However, if desired, additional strips 8 of metal may be laid on either side of the groove to extend its walls upwardly temporarily and provide for a continued control of the electrode movement. The electrode employed should have a substantially thick covering that does not fuse or stick to the side wall of the groove during the very short period of contact therebetween.

Referring to Fig. 5, the invention may be carried out in automatic welding by the apparatus illustrated. This apparatus has a telescopically adjustable vertical shaft 9 suspended from a frame 10 of the automatic welding machine and mounted for rotation in upper and lower ball bearings 11 and 12, respectively.

The lower end of the shaft 9 is positioned near the welding operations and has an arm 13 extending laterally toward the welding electrode 1 in the direction of the welding groove 2 with a pivoted extension 14 having an opening through which the electrode passes on its way to the arc. The extension 14 is held in alignment with arm 13 by two balanced springs 15 and 16, one on either side and extending from the side of the extension to the outer end of a cross arm 17 on the shaft 9.

As the shaft 9 is rotated through a predetermined part of one revolution and back again in rapid oscillation, the arm 13 and its extension 14 carry the electrode 1 from side to side of the welding groove 2, the normal oscillation being set for a longer stroke of movement of the electrode than is allowed by the width of the groove. As the electrode engages the side wall of the groove at each extremity of its movement, the extension 14 pivots on the end of arm 13 and springs 15 and 16 are biased off balance for the rest of the stroke of arm 13. When the arm 13 returns towards the center of the welding groove, the springs 15 and 16 approach a balanced condition after which they effect movement of extension 14 with the arm 13 and carrying of the electrode away from the side wall of the groove.

The shaft 9 may be oscillated in any suitable manner. As shown, a crank 18 near the upper end of the shaft is connected by a link 19 to a bell crank lever 20 oscillated through link 21 by the rotating crank 22, the latter being driven by a motor 23 and speed reduction device 24.

The link 19 has a turnbuckle 25 to adjust its length and to thereby adjust the centering of the electrode 1 in the groove 2. The bell crank lever 20 has an adjustable attachment for link 19 to provide for changing the length of the oscillatory rotation of shaft 9 so that the electrode will not be held against the side wall of the groove for too long a time in the case of relatively narrow grooves. This adjustment should provide for oscillation of the electrode sufficient to engage the side walls of the groove in the widest part of the latter, but need not provide for wider oscillation.

The motor 23 is of variable speed to provide an adjustment in the number of oscillations per minute of the electrode.

The invention has been applied in the welding of armor plate and of high pressure vessels where the welds must be of as sound a character and as uniform as possible.

The invention is claimed as follows:

1. The method of improving the uniformity of side wall fusion in the metallic arc deposition of weld metal in a relatively deep welding groove with a covered welding electrode, comprising rapidly oscillating the welding electrode from side to side of the groove as the electrode is advanced along the groove, and effecting a positive engagement between the covering of the electrode and the side wall of the groove at each extremity of movement of the electrode.

2. The method of improving the uniformity of side wall fusion in the metallic arc deposition of weld metal in a relatively deep welding groove with a covered welding electrode, comprising rapidly oscillating the welding electrode from side to side of the groove to provide a single pool of weld metal forming a layer deposit fused with the side walls of the groove as the electrode is advanced along the groove, and limiting the movement of the electrode in its oscillations by engagement of the same with the side walls of the groove.

3. In metallic electric arc welding of a seam, the improvement of oscillating a covered welding electrode from side to side into contact with abutments supported directly upon the work along either side of the seam as the electrode traverses the seam.

4. The method of improving the uniformity of side wall fusion in the metallic arc deposition of weld metal in a relatively deep welding groove with a covered electrode, comprising rapidly oscillating the welding electrode from side to side in the groove as the electrode is advanced along the groove to deposit a layer of weld metal therein, and similarly depositing successive layers of weld metal to fill the groove, and at the same time limiting the movement of the electrode in its oscillations by direct engagement of the same with the side walls of the groove during deposition of all but the upper portion of the weld and by direct engagement of the electrode with side abutments extending along the upper edges of the groove during deposition of the upper portion of the weld.

JOHN J. CHYLE.